United States Patent [19]

Legris

[11] 4,305,606

[45] Dec. 15, 1981

[54] QUICK-RELEASABLE CONNECTORS FOR FLEXIBLE PLASTIC PIPES

[75] Inventor: André Legris, Saint Maur, France

[73] Assignee: Societe Legris France S.A., Ozoir-la-Ferriere, France

[21] Appl. No.: 162,934

[22] Filed: Jun. 25, 1980

Related U.S. Application Data

[63] Continuation of Ser. No. 963,385, Nov. 24, 1978, abandoned.

[51] Int. Cl.³ .............................................. F16L 19/08
[52] U.S. Cl. ...................................... 285/39; 285/81; 285/323; 285/61
[58] Field of Search ................... 285/39, 323, 322, 80, 285/81, 321, 315, 89, 61

[56] References Cited

U.S. PATENT DOCUMENTS

| | | | |
|---|---|---|---|
| 1,587,079 | 6/1926 | Machino | 285/39 X |
| 2,040,155 | 5/1936 | Shoemaker | 285/39 |
| 3,177,018 | 4/1965 | Goodwin | 285/321 X |
| 3,653,689 | 4/1972 | Sapy et al. | 285/322 X |
| 3,761,601 | 9/1973 | Kaesser et al. | 285/321 X |
| 3,909,046 | 9/1975 | Legris | 285/323 X |
| 4,005,883 | 2/1977 | Guest | 285/322 |
| 4,021,062 | 5/1977 | Mariaulle | 285/39 |

FOREIGN PATENT DOCUMENTS 2413750  11/1974  Fed. Rep. of Germany ...... 285/323

*Primary Examiner*—Thomas F. Callaghan
*Attorney, Agent, or Firm*—Stevens, Davis, Miller & Mosher

[57] ABSTRACT

A quick-releasable coupling device for a pipe in disclosed, said coupling device comprising a connector body having first, second, third and fourth concentric bores, a collar retained in said first bore having an inner surface inclined to the axis of said bores, a clamping member disposed about a pipe within the collar arranged for axial movement relative thereto, said clamping member comprising a plurality of flexible jaws and means cooperating with the inclined surface of the collar for moving the jaws inwardly to clamp the pipe within the connector upon relative movement between the collar and clamp member, means in the second bore for forming a seal between the outer surface of the pipe and the wall of the second bore, said pipe being disposed in the first, second and third bores, and means fixed to the collar for guiding the pipe into the coupling having an abutment member for the end of the clamping member; and including the improvement wherein a separate pusher element is provided at the end of the connector opposite said body and surrounding the pipe and arranged for longitudinal sliding movement and spaced from a clamping actuating member and having a locking member releasably holding the pusher in a position slightly spaced from the clamping actuating member, so that upon releasing or removing the locking member the pusher may be slid along the pipe into engagement with the clamping actuating member, thereby releasing the clamping member from the pipe and permitting ready withdrawal of the pipe from the connector.

9 Claims, 7 Drawing Figures

QUICK-RELEASABLE CONNECTORS FOR FLEXIBLE PLASTIC PIPES

This is a continuation of application Ser. No. 963,385 filed Nov. 24, 1978 and now abandoned.

The present invention relates to connectors for pipes made of a flexible material, and especially a plastic material, which pipes in use undergo very considerable lateral oscillations. It relates to pipes which are straight but which undergo considerable lateral displacements. If further relates to spiral tubes of the kind now well known industrially for their flexibility, which permits them to be extended many meters from a compact assembly, and which are used for the distribution of fluids such as compressed air. These spiral tubes permit horizontal and lateral displacements and readily enable compressed air apparatuses such as pneumatic drill and screwdrivers and the like to be supplied with the necessary pressure fluid.

These pipes or tubes, which in use are very strongly pulled at their ends in particular, are generally supported at those ends by a steel spring which is implanted or inserted in the connector to which the tube is fixed and which, during the flexing movements, supports the plastic tube over a length varying from 5 to 20 centimeters, according to the diameter of the tube. It is absolutely essential for these tubes to be adequately supported at and near where they are fixed or attached to the connector, as otherwise their life would be very short and they would rapidly break at their implantations or points of insertion in the connector. For this reason it is impossible to do without the aforesaid support spring implanted or inserted in the connector.

In spite of all these precautions, the tubes frequently have to be replaced before they become dangerous to the user. There thus arises the problem of mounting and demounting these tubes, and it is precisely here that the present invention comes into consideration. The invention proposes to render instantaneous the demounting and mounting of these tubes, in spite of the presence of the spring. It is, in fact, possible to apply the new quick-action connectors for smooth tubes to this type of connection.

The objective of the present invention is thus to improve the quick-action connectors now well known from the Sapy and Legris U.S. Pat. No. 3,653,689. Additional improvements have been made by the present applicant in U.S. Pat. Nos. 3,999,783 and 3,909,046. In the last of these patents an embodiment is described, in FIG. 14, of a quick-action connector in which the guide spring is firmly implanted or inserted in the quick-action connector, and in which it is possible to mount the plastics tube, bare and in an instantaneous manner. On the other hand, however, it is impossible to demount or remove the tube without unscrewing the nut which acts as a casing for the assembly of the connector. Still another patent of some interest is Guest British Pat. No. 1,520,742, and especially its FIGS. 4 and 5.

The present invention proposes to improve such an overall system by providing for not only an instantaneous mounting but also for an instantaneous demounting of the tube, in spite of the presence of the guide spring. This renders the changing and maintenance of this type of spirally coiled tube much more practical and much easier under conditions of actual use.

Figure 1:
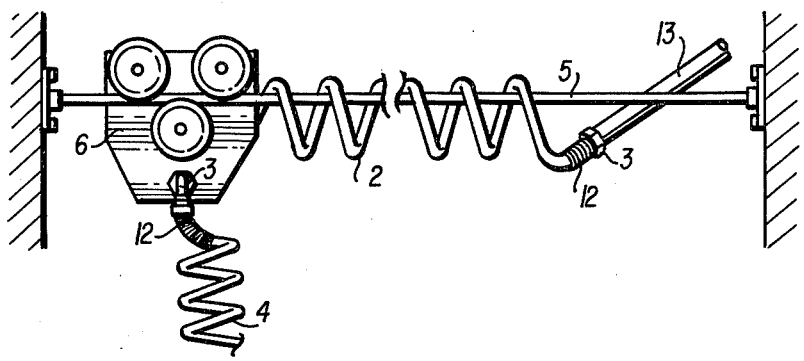
FIG. 1 shows the overall arrangement of a flexible spiral tube according to the present invention, with its end connectors, associated with a carriage running along a cable fastened between two supports.
Figure 2:
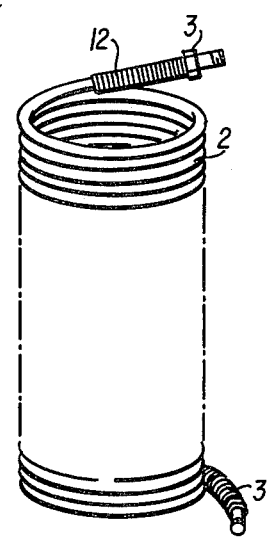
FIG. 2 shows the spiral tube by itself, equipped with its end connectors.

Considering now the several figures in greater detail, FIG. 1 shows a conventional three-wheeled carriage 6 running along cable 5 stretched between two supports. The spiral tube 2 (shown by itself in FIG. 2) is supplied with compressed air by a tube 13. The arrangement is such that the spiral tube 2 permits the carriage 6 to be displaced over the whole length of its cable 5, and to supply movable pneumatic machines (e.g., pneumatic drills and screwdrivers) a spiral tube leads down as far as the floor, but is shown cut at 4 in the drawing. Support springs 12 can be seen at the outlet of the connectors 3 in both FIGS. 1 and 2. From this arrangement, it is easy to understand the very considerable stresses which the spiral plastic tube undergoes at the point of implantation or insertion thereof in the connectors 3.

This type of connector must be favorable situated. The invention consists or consists essentially in fixing the double support spring in a movable pusher 11 axially guided in a mounting 9a (FIG. 3) and having its axial path limited on the one side by a crimp 9b and on the other side by the clamp 8, which the pusher can push back to the bottom of the connector.

Any inadvertent movement of the pusher is prevented by a safety locking element which may include a spring clip 12c placed in a groove 11b of the pusher 11. This clip 12c prevents the pusher from moving under pressure; the pusher 11 is thus perfectly fixed in the desired position, and it is not possible by pushing on the outer face 11c to cause it to move or advance. Security in normal use is thus complete.

The mounting of the tube 2 in the connector can be carried out in an instantaneous fashion and without having to pull back the clip 12c from its safety position.

On the other hand, to effect demounting or removal of the tube 2, for example to change it, it is merely necessary to remove the safety clip 12c which is an extremely easy operation. The clip 12c having been taken out or removed it is then sufficient to push on the outer face 11c of the pusher 11 with the fingers, so that the pusher pushes back the clamp 8 (i.e., to the left in FIG. 3) and disengages it from the locking cone 8a. This permits the tube 2 to be withdrawable (to the right in FIG. 3) without difficulty. As soon as the tube 2 is pulled out, the safety clip 12c is to be immediately replaced. It then only remains to mount a new spiral tube, simply by pushing its end into the connector, no other precautions being necessary.

One will observe here the improvement over the quick-action connectors of the U.S. patents cited above, comprising the "O" ring 6, the guide washer 7, and the clamp 8 with its locking cone 10a. This assembly is held on the body 3a by the locking and mounting nut 9.

In practice, the entire connector is delivered mounted so that in order to put it into use, it is only necessary to push the plastic tube 2 into the spring 12.

Figure 4:
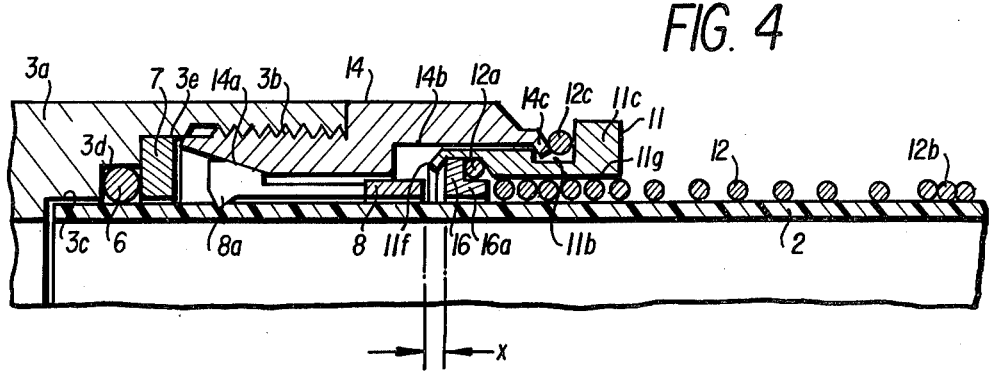
FIGS. 4, 5 and 6 are longitudinal sectional views showing three additional forms of devices according to the present invention.
Figure 5:
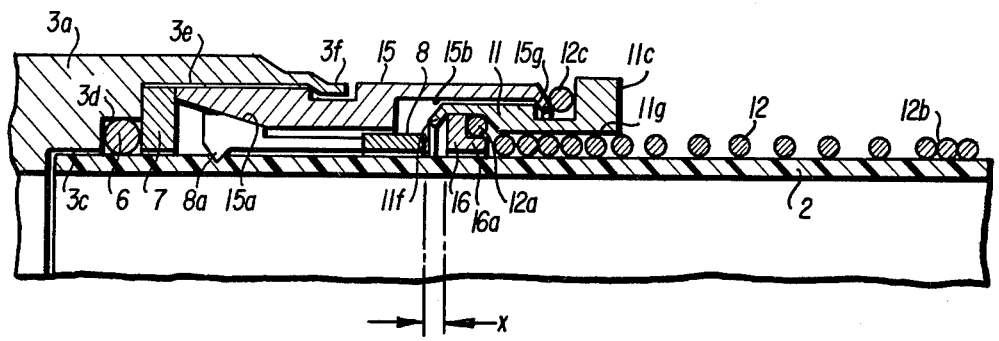
Figure 6:
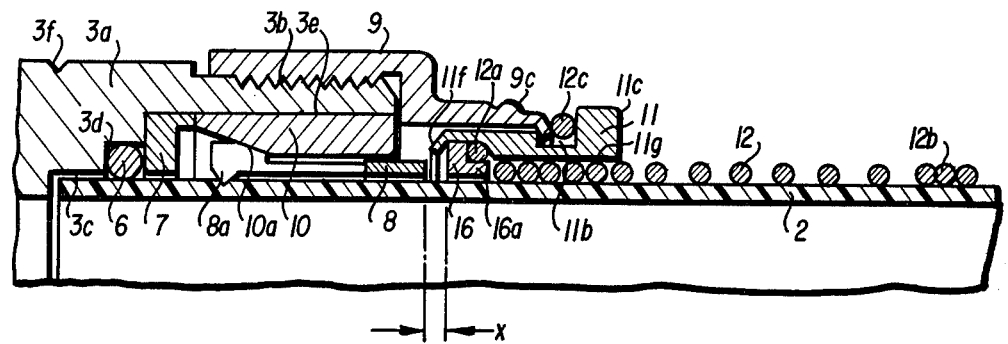

The spring 12 is held fixedly in the connector and never leaves it under the effect of vibrations or of mechanical traction. For this purpose several solutions or embodiments are envisaged: in FIG. 3, the spring is screwed by a screw thread lie within the part 11 and a crimped lip 11d prevents it from coming out by being turned or jammed between two turns of the spring. In FIGS. 4, 5 and 6, the spring 12 passes into a cylindrical mounting 11g of the pusher 11. The spring has a special larger turn 12a at the forward or inner end. A special washer 16, roughly "L"-shaped in cross-section, and constituting a guide for the tube 2, then wedges the turn 12a. This special washer 16 is locked in place in the pusher 11 by a crimp 11f. This procedure renders it impossible for the spring to be removed from the pusher.

The spring 12 possesses at its free end two or three close-set turns 12b, which give this end a good appearance and good strength.

The space "x" shown in FIGS. 3, 4, 5 and 6 corresponds to a security stop of the clamp 8 under traction and pressure forces on the tube; it is one of the important characteristics of the movable pusher 11 and which serves as safety stop for the clamp 8. This space of safety "x" of the clamp 8 permits the clamping by the latter to be limited and thus prevents it from clamping the plastic tube 2 with excessive force.

Other characteristics and advantages of the present invention will be still better understood upon reading the following detailed description of the embodiments shown in FIGS. 3 to 6.

Figure 3:
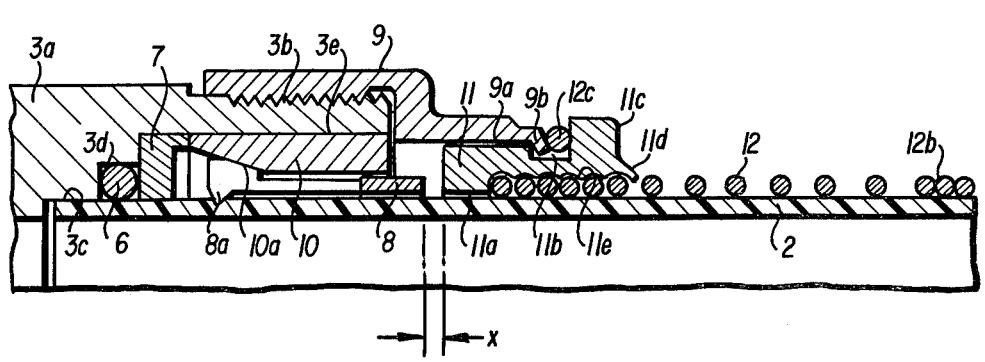
FIG. 3 is a view in longitudinal section showing one form of the device according to the present invention.

FIG. 3: Here the conventional quick-action connector comprising body 3a, an "O" ring 6, a guide washer 7, a clamp 8, a peg 10, and having a cone 10a, is held by a nut 9 screwed onto the body 3a by a thread 3b. The nut 9 maintains the assembly of the quick-action connector in its mounting 3e. The nut 9 has a tail having a mounting 9a in which the pusher 11 can move. This movement is limited by the crimp 9b which prevents the pusher 11 from escaping from the nut 9. The locking member comprising the safety clip 12c can be seen in the groove 11b and prevents the axial movement of the pusher. To effect movement of the pusher, it is necessary to remove the safety clip 12c. It is a split-spring clip, and may be provided with a catch lug (not shown) making it easy to grasp.

The pusher 11 has a cylindrical portion 11a which guides the plastic tube 2 and an internal large-pitch thread 11e enabling the spring to be screwed into the pusher 11. To prevent unscrewing and removal of the spring 12 in this screw, a crimp 11d is provided which prevents the turns of the spring leaving their thread.

The spring 12 is thus in effect integral with the pusher 11. At the other end there are three turns 12b which are close together and which give a good appearance and good strength.

FIG. 4: Here the body 3a is internally threaded rather than being externally threaded as in FIG. 3. A hollow externally threaded element 14 is screwed into the body 3a and carries the cone 14a locking the clamp 8. This hollow element 14 keeps the washer 7 in place in its mounting and the "O" ring in place in the mounting 3d. This hollow element 14 has a cylindrical bore 14b permitting the usual limited axial displacement of the pusher 11. It will be noted that in FIG. 4, the screw is fixed differently than in FIG. 3. The spring 12 enters exactly into a mounting 11g of the pusher 11. But the spring 12 is retained by a larger turn 12a which is wedged and fixed in the pusher 11 by a washer 16 having a cylindrical bore 16a. The washer 16 is made in effect integral with the pusher 11 by a crimp 11f. Thus the mounting completely locks the spring 12 in place, which is absolutely impossible to demount and which is made in effect integral with the pusher 11. The locking member for the pusher comprising the spring clip 12c is also present.

FIG. 5: Here the system is fixed on the body without any thread. The body 3a, having a smooth bore 3e, receives the hollow part 15 which is held in the body 3a by a crimp 3f. The part 15 comprises an internal cone 15a which locks the clamp 8. The part 15 maintains the guide washer 7 in its mounting 3e and the "O" ring in its mounting 3b. The part 15 comprises a cylindrical bore 15b in which the pusher 11 can move. The remainder of the pusher and of the spring and of the fixing of the spring are as already described in connection with FIG. 4. The locking member for the pusher comprising the spring clip 12c is present.

FIG. 6: FIG. 6 is identical to FIG. 3 except for the fixing of the spring in the pusher 11 which is according to, and identical with, that of FIGS. 4 and 5.

Figure 7:
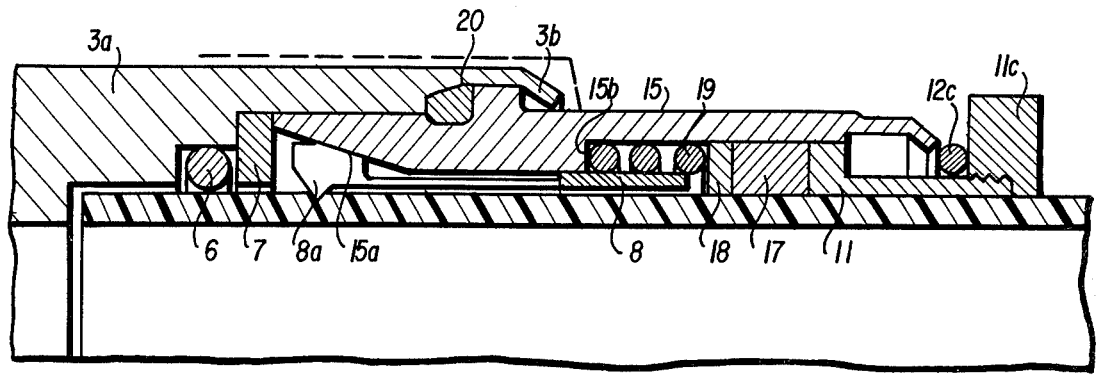
FIG. 7 shows still another embodiment.

FIG. 7: This figure shows still another variant of the embodiment shown in FIG. 5 wherein a tight joint or seal 17 of toroidal shape is placed between the pusher 11 and the end of the clamp 8 so as to ensure tightness between the hollow part 15 and the pipe.

To secure the joint or seal 17 on one side against the pusher 11, the latter is still further supported on the other side by a ring 18 which is mounted in the hollow part 15 and engaging the base 15b thereof.

This arrangement makes it possible to compress the joint or seal 17 between the ring 18 and the pusher 11, under the effect of the pressure of the liquid, and over an area of the pipe which cannot be scratched by edges 8a of the clamp 8. This insures an improvement of the tightness and resistance to all pressures in smooth or grooved pipes.

Moreover, a groove 20 is provided between the body 3a and the hollow part 15 at the level of the thread 3b.

The pusher 11 of course may be provided with a guiding spring 12 (not shown) as in the other embodiments.

The system of fixing the spring as shown in FIG. 3 is of course applicable to FIGS. 4, 5, 6 and 7 while still remaining within the scope of the invention.

Various modifications may of course be introduced by those skilled in the art to the devices described above solely by way of non-limitative example, without departing from the scope of the invention. In particular, the locking securement of the pusher 11 by the crimp 9b of FIG. 3, 14c of FIG. 4, 15c of FIG. 5 and 9b of FIG. 6 may be replaced by one skilled in the art by any other securement system preventing the pusher 11 from leaving the part, respectively, 9, 14, 15, 9.

The possibilities of industrial application of the present invention are extremely numerous; e.g., the distribution of compressed air in a very movable manner in factories; the distribution of compressed air for trailer brakes for trucks having a trailer (trucks are nearly always equipped with this type of spiral plastic tube already); the distribution of various fluids, such as gases, or water, to mobile positions, for example, for washing or painting; etc.

What is claimed is:

1. In a quick-release coupling device for a pipe, said coupling device for a pipe comprising a connector body having first, second, third and fourth concentric bores, a collar retained in said first bore having an inner surface inclined to the axis of said bores, a clamping member disposed about a pipe within the collar arranged for axial movement relative thereto, said clamping member comprising a plurality of flexible jaws and means cooperating with the inclined surface of the collar for moving the jaws inwardly to clamp the pipe within the coupling device upon relative movement between the collar and clamping member, means in the second bore for forming a seal between the outer surface of the pipe and the wall of the second bore, said pipe being disposed in the first, second and third bores, and annular clamping means fixed to the collar for guiding the pipe into the coupling device having an abutment member for the end of the clamping member; the improvement wherein a separate pusher element is provided at the end of the coupling device opposite said body and surrounding the pipe and arranged for longitudinal sliding movement and spaced from the clamping member and having a locking member releasably holding the pusher element in a position slightly spaced from the clamping member, so that upon removing the locking member the pusher element may be moved along the pipe into engagement with the clamping member, thereby releasing the clamping member from the pipe and permitting ready withdrawal of the pipe from the coupling device.

2. A quick-releasable coupling device for a pipe as defined in claim 1, including a supporting coiled spring of relatively short length and of an inner diameter slightly larger than the outer diameter of the pipe to be accommodated by the coupling device and said spring being fixed within the pusher element.

3. A quick-releasable coupling device for a pipe as defined in claim 2, wherein the pusher element is provided with internal threads to accommodate and hold the coiled spring in fixed position, and a crimping tab near the inner end of said coiled spring adapted to be forced into engagement between two successive turns thereof to fix the spring in position within the pusher element.

4. A quick-releasable coupling device for a pipe as defined in claim 2, wherein the coiled spring is fixed in position within the pusher element by locking the innermost turn thereof between the pusher element and a separate collar surrounding the pipe and held in position by a crimping action of an innermost portion of the pusher element.

5. A quick-releasable coupling device for a pipe as defined in claim 1, wherein the locking member is a spring clip.

6. A quick-releasable coupling device for a pipe as defined in claim 5, wherein the spring clip is a split-spring clip.

7. A quick-releasable coupling device for a pipe as defined in claim 1, wherein a sealed chamber is disposed between the pusher element and the end of the clamping member.

8. A quick-releasable coupling device for a pipe as defined in claim 7, wherein a sealing ring is disposed between said pusher element and the end of the clamping member and the ring is pressed against the pusher element by a spring to seal said chamber.

9. An apparatus for supplying air under pressure for actuation of a pneumatic device comprising a support cable disposed tautly between laterally spaced rigid support members, a carriage movably mounted on the cable for traversing the space between said rigid support members, a first self-storing tubing connected at one end to said carriage and at its opposite end to a source of air under pressure, said first tubing being adapted to expand and contract in length as the carriage moves on the cable, and a second self-storing tubing connected at one end to the carriage associated with said first tubing for flow of compressed air between the said first and second tubings, said second tubing being connected to said pneumatic actuated device, for flow of air under pressure to the said pneumatic actuated device, said end of the first tube which is connected to a source of air under pressure and the said end of said second tube which is connected to said carriage being connected by a quick-release coupling device comprising a connector body having first, second, third and fourth concentric bores, a collar retained in said first bore having an inner surface inclined to the axis of said bores, a clamping member disposed about a pipe within the collar arranged for axial movement relative thereto, said clamping member comprising a plurality of flexible jaws and means cooperating with the inclined surface of the collar for moving the jaws inwardly to clamp the pipe within the coupling device upon relative movement between the collar and clamping member, means in the second bore for forming a seal between the outer surface of the pipe and the wall of the second bore, said pipe being disposed in the first, second and third bores, and annular clamping means fixed to the collar for guiding the pipe into the coupling device having an abutment member for the end of the clamping member; the improvement wherein a separate pusher element is provided at the end of the coupling device opposite said body and surrounding the pipe and arranged for longitudinal sliding movement and spaced from the clamping member and having a locking member releasable holding the pusher element in a position slightly spaced from the clamping member, so that upon removing the locking member the pusher element may be moved along the pipe into engagement with the clamping member, thereby releasing the clamping member from the pipe and permitting ready withdrawal of the pipe from the coupling device.

* * * * *